(12) United States Patent
Inoue (10) Patent No.: US 11,664,891 B2
(45) Date of Patent: May 30, 2023

(54) OPTICAL MULTIPLEXER/DEMULTIPLEXER, OPTICAL SUBMARINE CABLE SYSTEM, OPTICAL MULTIPLEXING/DEMULTIPLEXING METHOD, AND NON-TRANSITORY COMPUTER READABLE MEDIUM (71) Applicant: NEC Corporation, Tokyo (JP)

(72) Inventor: Takanori Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 93 days.

(21) Appl. No.: 17/435,480

(22) PCT Filed: Dec. 16, 2019

(86) PCT No.: PCT/JP2019/049164
§ 371 (c)(1),
(2) Date: Sep. 1, 2021

(87) PCT Pub. No.: WO2020/179182
PCT Pub. Date: Sep. 10, 2020

(65) Prior Publication Data
US 2022/0140898 A1 May 5, 2022

(30) Foreign Application Priority Data
Mar. 4, 2019 (JP) .............................. JP2019-038360

(51) Int. Cl.
H04J 14/02 (2006.01)
H04B 10/077 (2013.01)

(52) U.S. Cl.
CPC ...... H04B 10/0775 (2013.01); H04J 14/0212 (2013.01)

(58) Field of Classification Search
CPC .................................................. H04J 14/0212
See application file for complete search history.

(56) References Cited

U.S. PATENT DOCUMENTS

2005/0024715 A1 2/2005 Inoue et al.
2014/0286635 A1 9/2014 Kaneko et al.
(Continued)

FOREIGN PATENT DOCUMENTS

EP 2595334 A2 5/2013
JP 2005-051598 A 2/2005
(Continued)

OTHER PUBLICATIONS

Extended European Search Report for EP Application No. 19917704.9 dated Mar. 4, 2022.
(Continued)

Primary Examiner — Shi K Li
(74) Attorney, Agent, or Firm — Sughrue Mion, PLLC (57) ABSTRACT An optical multiplexer/demultiplexer according to an example embodiment includes: an OCM configured to measure a strength of each of optical signals in a plurality of wavelength bands input to a WSS and to determine an optical signal wavelength band and a noise wavelength band based on the measured strengths; the OCM configured to pass the optical signal in the optical signal wavelength band determined by the OCM as a primary signal; a dummy light generation unit configured to generate dummy light in which the optical signal wavelength band has been extinguished; and an optical coupler configured to multiplex the primary signal output from the WSS with the dummy signal into a wavelength division multiplexing optical signal and to output the wavelength division multiplexing optical signal to an optical transmission path.

8 Claims, 12 Drawing Sheets (56) References Cited

U.S. PATENT DOCUMENTS

| | | | |
|---|---|---|---|
| 2017/0126326 A1 | 5/2017 | Aida | |
| 2018/0034544 A1 | 2/2018 | Satou | |
| 2018/0069648 A1 | 3/2018 | Inada | |
| 2018/0267266 A1* | 9/2018 | Yilmaz | ............. G02B 6/29395 |
| 2019/0052356 A1 | 2/2019 | Inoue | |
| 2019/0296851 A1* | 9/2019 | Jiang | ................ H04B 10/07953 |
| 2020/0076526 A1* | 3/2020 | Winzer | ............. H04B 10/5161 |

FOREIGN PATENT DOCUMENTS

| | | |
|---|---|---|
| JP | 2006-005639 A | 1/2006 |
| JP | 2012-160947 A | 8/2012 |
| JP | 2014-187671 A | 10/2014 |
| JP | 2018-164278 A | 10/2018 |
| WO | 2015/145985 A1 | 10/2015 |
| WO | 2016/139933 A1 | 9/2016 |
| WO | 2017/154454 A1 | 9/2017 |

OTHER PUBLICATIONS

International Search Report for PCT Application No. PCT/JP2019/049164, dated Feb. 25, 2020.

* cited by examiner

OPTICAL MULTIPLEXER/DEMULTIPLEXER, OPTICAL SUBMARINE CABLE SYSTEM, OPTICAL MULTIPLEXING/DEMULTIPLEXING METHOD, AND NON-TRANSITORY COMPUTER READABLE MEDIUM

This application is a National Stage Entry of PCT/JP2019/049164 filed on Dec. 16, 2019, which claims priority from Japanese Patent Application 2019-038360 filed on Mar. 4, 2019, the contents of all of which are incorporated herein by reference, in their entirety.

TECHNICAL FIELD

The present invention is related to an optical multiplexer/demultiplexer, an optical submarine cable system, an optical wavelength division multiplexing communication method, and a non-transitory computer readable medium.

BACKGROUND ART

As a communication method for realizing data communication in a large capacity, wavelength division multiplexing (WDM) communication is known. In wavelength division multiplexing communication, a plurality of optical signals having mutually-different wavelengths are multiplexed and transmitted. Wavelength division multiplexing communication is also used in long-distance optical transmission systems such as optical submarine cable systems.

In an optical submarine cable system, in order to achieve homogeneous transmission characteristics in the entire transmission band, it is important to manage wavelength dependency of insertion loss exhibited by the devices arranged on optical transmission paths and the constituent elements thereof. In recent years, a reconfigurable optical add/drop multiplexer (ROADM) function capable of dynamically changing path routes in a network has started being applied also to optical submarine cable systems. As an optical device realizing the ROADM function, a wavelength selective switch is known.

The wavelength selective switch has the following three functions: a demultiplexing function to separate an input optical signal in units of wavelengths; a switching function to select from among the optical signals resulting from the demultiplexing; and a multiplexing function to multiplex the selected optical signal. Generally speaking, insertion loss characteristics of wavelength selective switches have wavelength dependency. The wavelength dependency varies depending on environment temperatures and degradation over the course of time.

To cope with this situation, Patent Literature 1 discloses a technique by which insertion losses of a wavelength selective switch at various wavelengths are estimated, based on a difference between the optical strength at each wavelength obtained while dummy signal light is inserted in a primary signal in which optical signals having a plurality of wavelengths are multiplexed and the optical strength at each wavelength obtained while no dummy signal light is inserted in the primary signal, so as to control the insertion losses of the wavelength selective switch based on a result of the estimation.

CITATION LIST

Patent Literature

Patent Literature 1: International Patent Publication No. WO 2017/154454

SUMMARY OF INVENTION

Technical Problem

In commonly-used optical submarine cable systems, the ROADM function is provided in a branching device installed on the sea bed. For this reason, if the ROADM function needs to be changed after an optical submarine cable system starts being used, it is necessary to pull up the branching device from the sea bed onto the land. To cope with this situation, there is an idea that, without terminating signals in a branch station provided on the land, optical signals are delivered to an opposite station by using an on-land ROADM function called a dry-ROADM function.

As for wavelength division multiplexing optical signals input to the branch station having the dry-ROADM function, a part of the input signals is branched ("dropped") by a wavelength selective switch, and also, a new optical signal to be delivered to an opposite station is inserted therein ("added"), before being output again to an optical transmission path. On such occasion, dummy light is inserted into the part other than the wavelength band of the optical signal to be delivered to the opposite station, for the purpose of stabilizing gain characteristics of an optical amplification repeater in the optical submarine cable system.

As a device that realizes the dry-ROADM function, an optical multiplexer/demultiplexer is known in which a wavelength selective switch is used together with an optical channel monitor (OCM). When an optical signal to be delivered to an opposite station is newly added, the optical channel monitor measures the strength of the optical signal. When the measured strength exceeds a threshold value determined in advance, the dummy light in a wavelength band corresponding to the optical signal is extinguished.

In such a system, when the noise level of the optical signal to be delivered to the opposite station using the dry-ROADM function is high, and if the noise level exceeds the threshold value, the dummy light is extinguished even though the optical signal is not present, which increases the power per optical signal to be output to the optical transmission path. Further, when a signal having excessive power is input, a problem arises where characteristics deteriorate because the power of the other optical signals decreases.

In view of the problem described above, it is an object of the present disclosure to provide an optical multiplexer/demultiplexer, an optical submarine cable system, an optical multiplexing/demultiplexing method, and a non-transitory computer readable medium capable of suppressing deterioration of optical signal characteristics, even when the noise level of an optical signal to be delivered to an opposite station is high.

Solution to Problem

An optical multiplexer/demultiplexer according to an aspect of the present invention includes: an optical strength monitor configured to measure a strength of each of optical signals in a plurality of wavelength bands input to a wavelength selective switch and to determine an optical signal wavelength band and a noise wavelength band based on the measured strengths; the wavelength selective switch configured to pass the optical signal in the optical signal wavelength band determined by the optical strength monitor as a primary signal; dummy light generation means for generating dummy light in which the optical signal wavelength band has been extinguished; and a multiplexer configured to multiplex the primary signal output from the wavelength selective switch with the dummy light into a wavelength division multiplexing optical signal and to output the wavelength division multiplexing optical signal to an optical transmission path.

An optical multiplexing/demultiplexing method according to an aspect of the present invention includes: measuring a strength of each of optical signals in a plurality of wavelength bands input to a wavelength selective switch and determining an optical signal wavelength band and a noise wavelength band based on the measured strengths; causing the wavelength selective switch to pass the optical signal in the determined optical signal wavelength band as a primary signal; generating dummy light in which the optical signal wavelength band has been extinguished; and multiplexing the primary signal with the dummy light into a wavelength division multiplexing optical signal and outputting the wavelength division multiplexing optical signal to an optical transmission path.

A non-transitory computer readable medium according to an aspect of the present invention is configured to cause a computer to execute: a process of measuring a strength of each of optical signals in a plurality of wavelength bands input to a wavelength selective switch and determining an optical signal wavelength band and a noise wavelength band based on the measured strengths; a process of causing the wavelength selective switch to pass the optical signal in the determined optical signal wavelength band as a primary signal; a process of generating dummy light in which the optical signal wavelength band has been extinguished; and a process of multiplexing the primary signal with the dummy light into a wavelength division multiplexing optical signal and outputting the wavelength division multiplexing optical signal to an optical transmission path.

Advantageous Effects of Invention

According to the present invention, it is possible to suppress the deterioration of the optical signal characteristics, even when the noise level of the optical signal to be delivered to the opposite station is high.

DESCRIPTION OF EMBODIMENTS

The following will describe example embodiments of the present invention with reference to the drawings. To make the explanation clearer, the following description and the drawings have some omissions and are simplified, as appropriate. Further, the constituent elements depicted in the drawings as functional blocks that perform various processes may be configured, in terms of hardware, by using a CPU, memory, and other circuits. Further, in the present invention, it is also possible to realize arbitrary one or more of the processes by causing a central processing unit (CPU) to execute a computer program. Accordingly, it is understood among persons skilled in the art that these functional blocks may be realized in various forms, such as by only hardware, by only software, or by a combination of the two, and possible configurations are not limited to a certain option.

Further, the abovementioned program may be stored by using a non-transitory computer readable medium of any of various types so as to be supplied to the computer. The non-transitory computer readable medium may be a tangible storage medium of any of various types. Examples of the non-transitory computer readable medium include a magnetic storage medium (e.g., a flexible disk, a magnetic tape, a hard disk drive), a magneto optical storage medium (e.g., a magneto optical disk), a CD read only memory (CD-ROM), a CD-R, a CD-R/W, and a semiconductor memory (e.g., a mask ROM, a programmable ROM [PROM], an erasable ROM [EPROM], a flash ROM, a random access memory [RAM]). Furthermore, the program may be supplied to the computer via a transitory computer readable medium of any of various types. Examples of the transitory computer readable medium include an electrical signal, an optical signal, and an electromagnetic wave. The transitory computer readable medium is capable of supplying the program to the computer via a wired communication path such as an electric wire or an optical fiber, or a wireless communication path.

Figure 1:
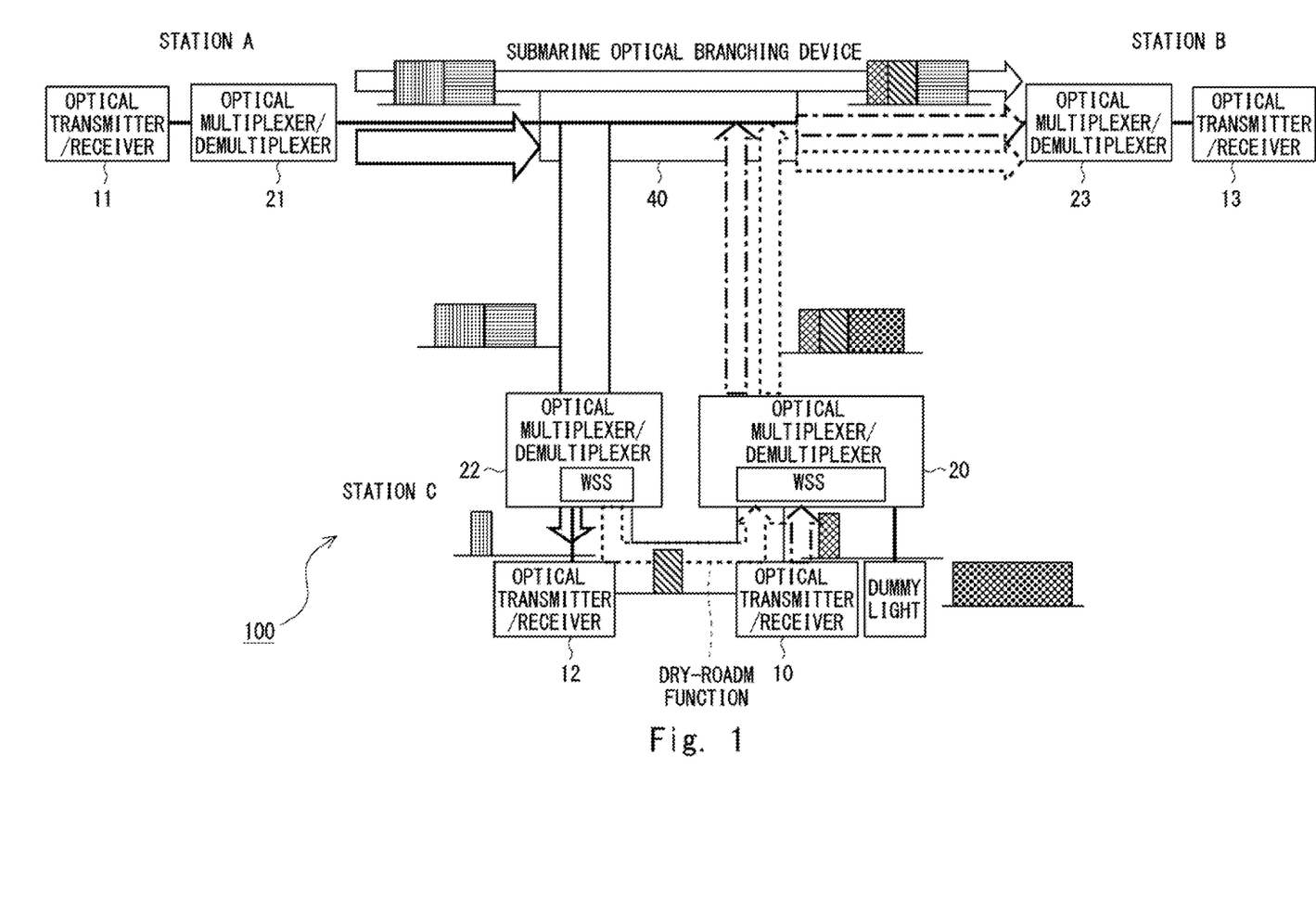
FIG. 1 is a diagram showing a configuration of an optical submarine cable system according to an example embodiment.

The example embodiments are related to a technique for multiplexing/demultiplexing wavelength division multiplexing optical signals. An optical multiplexer/demultiplexer according to an example embodiment can suitably be applied to optical submarine cable systems. To begin with, a configuration of an optical submarine cable system will be explained, with reference to FIG. 1. FIG. 1 is a diagram showing a configuration of an optical submarine cable system 100 according to an example embodiment. In FIG. 1, to simplify the explanation, optical signals only in the direction from station A to station B are indicated with the arrows.

As shown in FIG. 1, the optical submarine cable system 100 includes station A, station B, and station C that are provided on the land. Station A and station B provided so as to be opposite to each other are connected together by an optical submarine cable. Station A and station B are each a terminal station that terminates the optical submarine cable. Station A and station B may be called trunk stations. A submarine optical branching device 30 is inserted at a certain point of the optical submarine cable provided between station A and station B. The submarine optical branching device 30 is installed on the sea bed. In the example in FIG. 1, the submarine optical branching device 30 has an OADM function, but does not necessarily need to have the OADM function. The submarine optical branching device 30 and station C are connected to each other by an optical submarine cable. Station C may be called a branch station.

Among Stations A, B, and C, wavelength division multiplexing optical signals (hereinafter "WDM signals") are transmitted via the optical submarine cables. Station C delivers all or a part of received WDM signals to an opposite station by using a dry-ROADM function. The dry-ROADM function denotes a configuration in which, for an optical transmitter/receiver 10, a reconfigurable optical add/drop multiplexer (ROADM) function is provided at station C being a land station, instead of in the submarine optical branching device 30.

As for the WDM signals input to station C, a part thereof is branched ("dropped") by a wavelength selective switch (hereinafter, "WSS") (explained later), and also, a new optical signal to be delivered to an opposite station is inserted therein ("added"), before being output again to the optical submarine cable serving as an optical transmission path.

More specifically, station A includes an optical transmitter/receiver 11 and an optical multiplexer/demultiplexer 21. Station B includes an optical transmitter/receiver 13 and an optical multiplexer/demultiplexer 23. The same configurations are shared by the optical transmitter/receiver 11 and the optical transmitter/receiver 13 and by the optical multiplexer/demultiplexer 21 and the optical multiplexer/demultiplexer 23. Both station A and station B are each able to function as a transmitter and a receiver.

The following will describe an example in which optical signals are transmitted from station A to station B. The optical transmitter/receiver 11 is communicably connected to the optical multiplexer/demultiplexer 21. The optical transmitter/receiver 11 receives communication data and generates an optical signal on which the communication data is multiplexed and which is transmittable via the optical submarine cable. The optical transmitter/receiver 11 outputs the generated optical signal to the optical multiplexer/demultiplexer 21. The optical multiplexer/demultiplexer 21 receives optical signals that are input thereto from the optical transmitter/receiver 11 and that are in a plurality of wavelength bands, further generates WDM optical signals resulting from wavelength division multiplexing, and outputs the generated WDM optical signals to the optical submarine cable.

Station C includes an optical transmitter/receiver 12, an optical multiplexer/demultiplexer 22, the optical transmitter/receiver 10, and an optical multiplexer/demultiplexer 20. The WDM signals from the optical submarine cable are input to the optical multiplexer/demultiplexer 22. The optical multiplexer/demultiplexer 22 includes a WSS and is capable of selecting an optical signal with respect to each of the plurality of wavelength bands. The optical multiplexer/demultiplexer 22 branches ("drops") a part of the optical signals to the optical transmitter/receiver 12 and passes the rest of the optical signals (through) to the optical multiplexer/demultiplexer 20. The optical transmitter/receiver 10 outputs, to the optical multiplexer/demultiplexer 20, a new optical signal which is to be delivered to station B being an opposite station and which is in a wavelength band different from that of the optical signal received from the optical multiplexer/demultiplexer 22.

The optical multiplexer/demultiplexer 20 inserts ("adds") the optical signal input from the optical transmitter/receiver 10, into (to) the optical signal input from the optical multiplexer/demultiplexer 22, so as to generate WDM optical signals resulting from wavelength division multiplexing and to output the generated WDM optical signals to the optical submarine cable. The optical signal input from the optical multiplexer/demultiplexer 22 and the optical signal input from the optical transmitter/receiver 10 are the optical signals to be transmitted to station B. In this situation, at the optical multiplexer/demultiplexer 20, dummy light is inserted into the part other than the wavelength bands of the optical signals to be delivered to station B.

Figure 9:
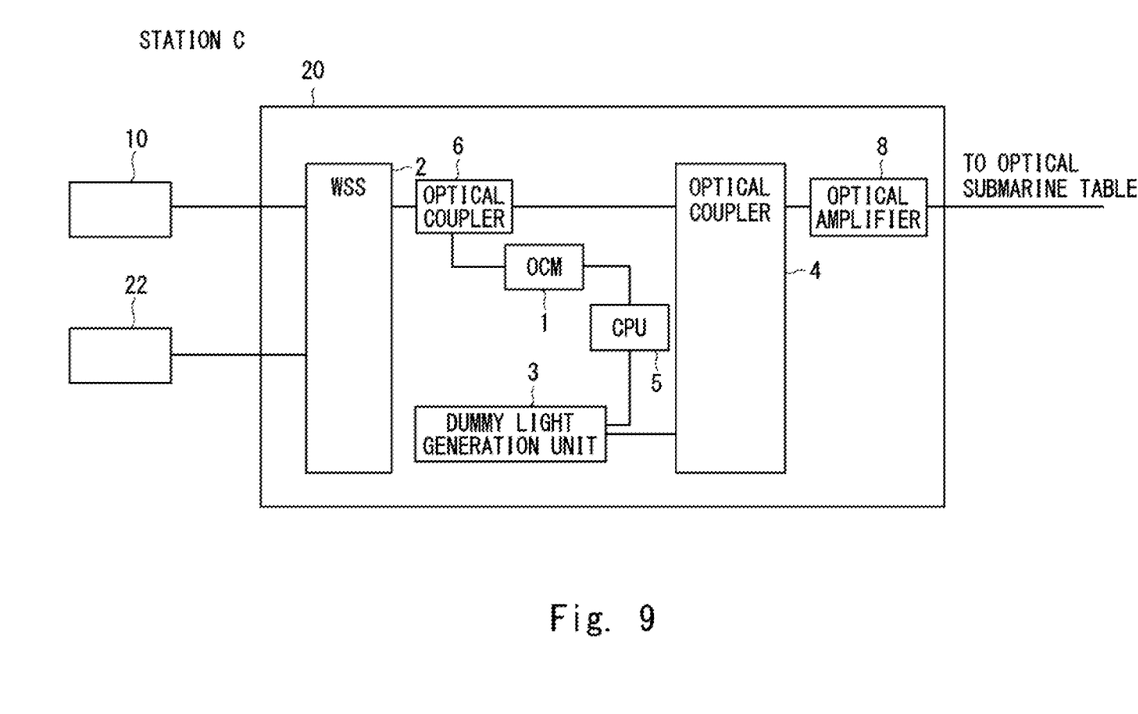
FIG. 9 is a diagram showing a comparison example of an optical multiplexer/demultiplexer.
Figure 10:
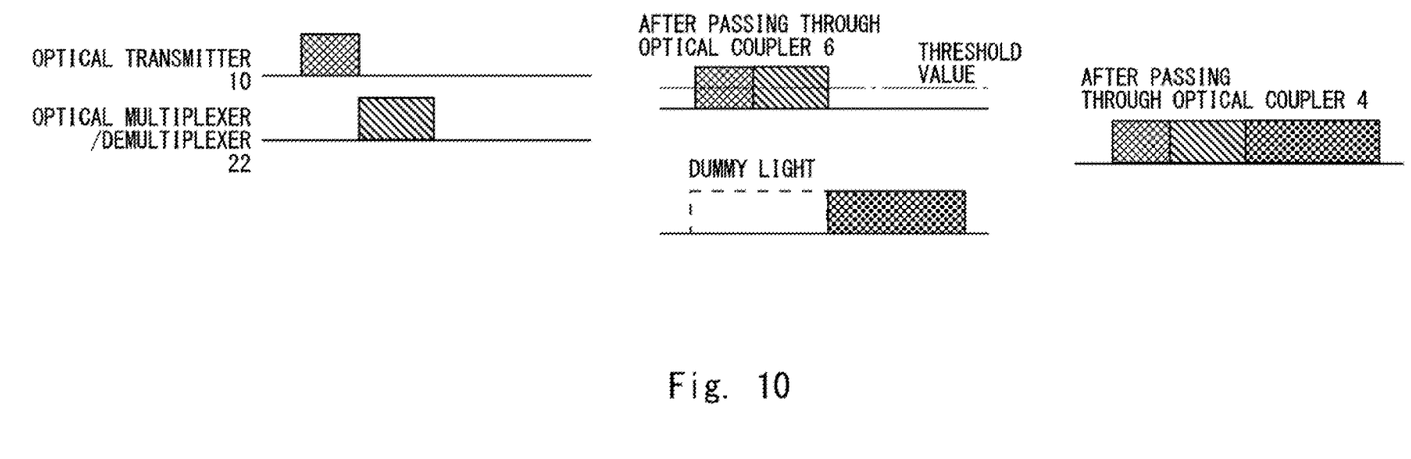
FIG. 10 is a drawing for explaining wavelength division multiplexing optical signals obtained in a comparison example.
Figure 11:
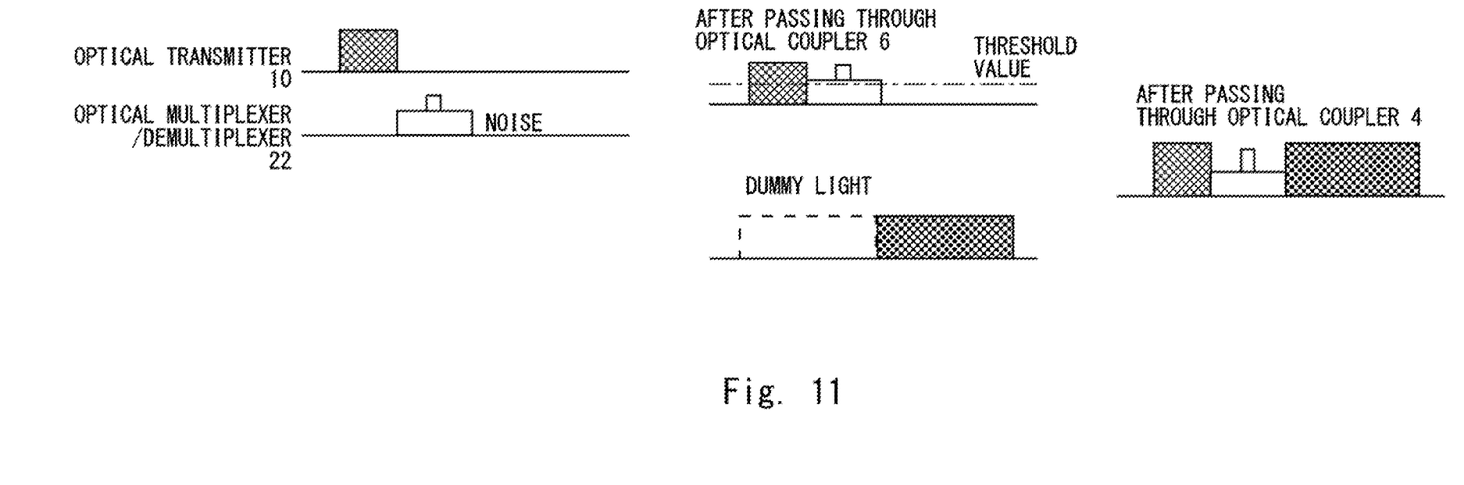
FIG. 11 is a drawing for explaining wavelength division multiplexing optical signals obtained in another comparison example.

Next, problems to be solved by the present invention will be explained with reference to FIGS. 9 to 11. FIG. 9 is a diagram showing a comparison example of an optical multiplexer/demultiplexer. FIGS. 10 and 11 are drawings for explaining wavelength division multiplexing optical signals obtained in the comparison examples. As shown in FIG. 9, the optical multiplexer/demultiplexer 20 in the comparison example includes an optical channel monitor (hereinafter, "OCM") 1, a WSS 2, a dummy light generation unit 3, an optical coupler 4, and an optical amplifier 8. An optical signal from the optical transmitter/receiver 10 and an optical signal from the optical multiplexer/demultiplexer 22 are input through two mutually-different input ports of the WSS 2, respectively. The WSS 2 multiplexes these two optical signals together and outputs the result to the optical coupler 6.

The optical coupler 6 branches the input optical signals and outputs the result to the OCM 1. As the OCM 1, it is possible to use one having a commonly-used configuration including a wavelength separation unit and a strength measurement unit. The wavelength separation unit includes a wavelength variable filter that passes an optical signal in a specific wavelength band and is configured to separate optical signals with respect to each wavelength band. The strength detection unit includes an optical reception element and is configured to receive the optical signals separated by the wavelength separation unit, to measure the strength of the optical signal with respect to each wavelength band, and to output a measurement result to a control unit 5. In other words, the OCM 1 constantly monitors the strengths of the optical signal from the optical transmitter/receiver 10 and of the optical signal from the optical multiplexer/demultiplexer 22 that are in mutually-different wavelength bands.

As shown in FIG. 10, the control unit 5 determines that a wavelength band in which the strength of the optical signal past the optical coupler 6 exceeds a predetermined threshold value is the optical signal wavelength band in which the optical signal to be transmitted to station B is present. Further, the control unit 5 exercises control so that the dummy light generation unit 3 automatically turns off the output of the dummy light corresponding to the determined optical signal wavelength band.

The dummy light generation unit 3 generates the dummy light used for stabilizing gain characteristics of an optical amplification repeater (not shown) of the optical submarine cable system 100. As explained above, due to the control exercised by the control unit 5, the dummy light generation unit 3 outputs the dummy light in which the optical signal wavelength band has been extinguished. The optical coupler 4 multiplexes the optical signals multiplexed by the WSS 2 with the dummy light in which the optical signal wavelength band has been extinguished and further outputs the optical signals resulting from the multiplexing, to the optical amplifier 8. The optical amplifier 8 amplifies the optical signals output from the optical coupler 4 and outputs the result as wavelength division multiplexing optical signals to the optical submarine cable.

FIG. 11 shows optical signals in a situation where the noise level of the optical signal to be delivered to station B is high. When the noise level exceeds a threshold value, the dummy light is extinguished even though the optical signal is actually not present, which increases the power per optical signal to be output to an optical transmission path. Further, when a signal having excessive power is input, a problem arises where characteristics deteriorate because the power of the other optical signals decreases.

To cope with this situation, the inventor of the present invention conceived of a configuration in which the control unit 5 stores therein, in advance, the existing wavelength band of the optical signal from the optical transmitter/receiver 10 being contained in the wavelength division multiplexing optical signals from station A and the wavelength band (an additional wavelength band) of the optical signal from the optical multiplexer/demultiplexer 22 that is newly inserted at the optical multiplexer/demultiplexer 20, so that the OCM 1 extinguishes only the dummy light in the additional wavelength band out of the wavelength band in which strengths of optical signals exceed a predetermined threshold value. This configuration, however, has a problem where the user would need to manage the wavelength bands of the optical signals.

Figure 12:
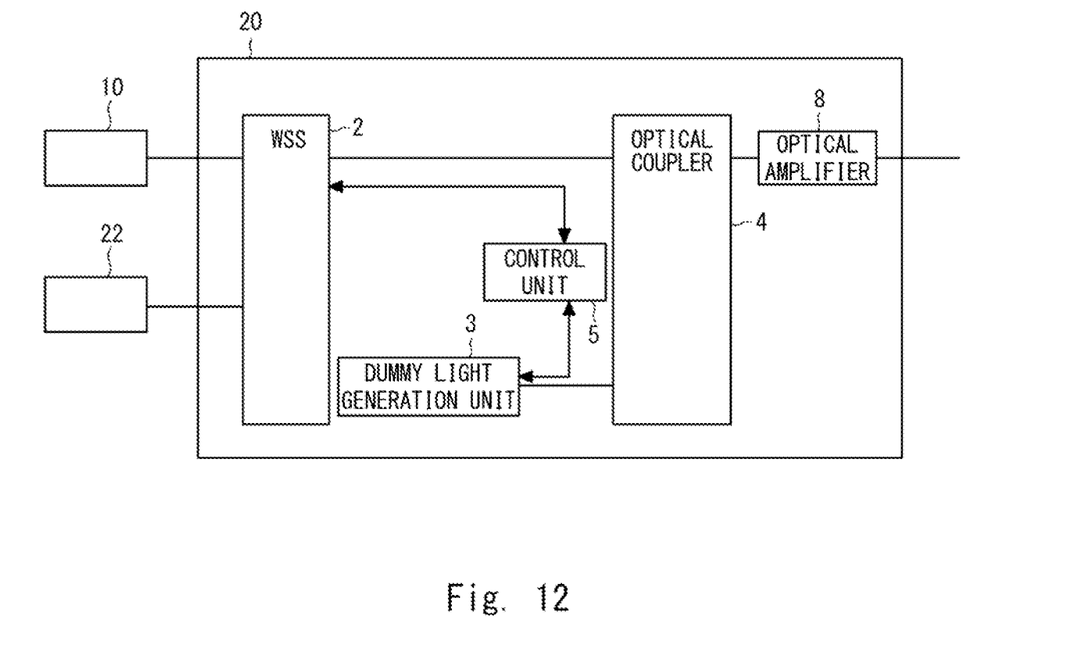
FIG. 12 is a diagram showing a proposed example of an optical multiplexer/demultiplexer.

The inventor of the present invention also conceived of a configuration in which, as shown in FIG. 12, the WSS 2 is configured so as not to pass unnecessary wavelength bands, so that dummy light in the optical signal wavelength bands which the WSS 2 is configured to pass is extinguished. This configuration, however, has a problem where convenience of the user would be lost. In view of these circumstances, the inventor of the present invention conceived of the optical multiplexer/demultiplexer 20 according to the example embodiment as described below.

Figure 2:
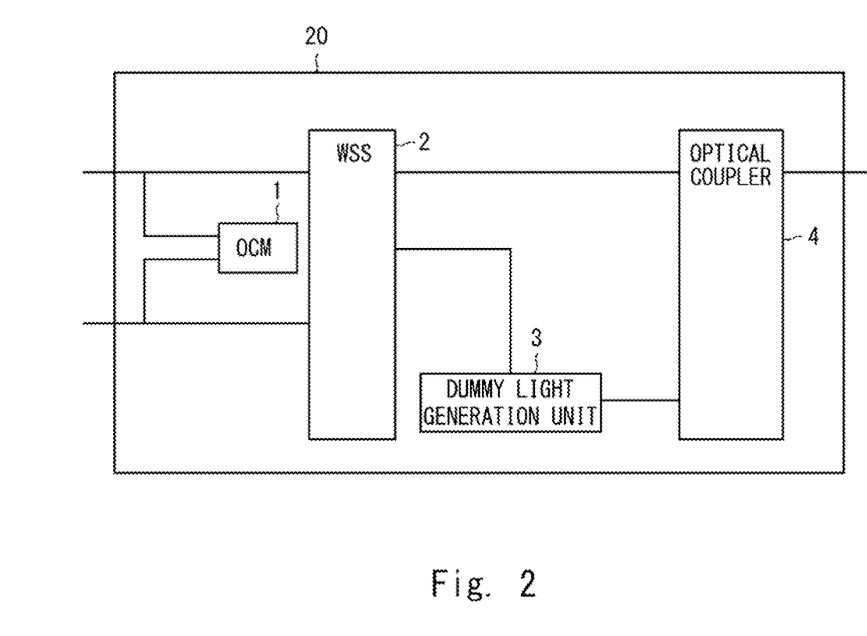
FIG. 2 is a diagram showing a schematic configuration of an optical multiplexer/demultiplexer according to the example embodiment.

FIG. 2 is a diagram showing a schematic configuration of the optical multiplexer/demultiplexer 20 according to the example embodiment. The optical multiplexer/demultiplexer 20 according to the example embodiment is installed in the branch station on the land described above. As explained above, the branch station structures the reconfigurable optical add/drop multiplexer (ROADM) by using the optical multiplexer/demultiplexer 20. As shown in FIG. 2, the optical multiplexer/demultiplexer 20 includes the OCM 1, the WSS 2, the dummy light generation unit 3, and the optical coupler 4.

The OCM 1 is an optical strength monitor that measures the strength of each of the optical signals in a plurality of wavelength bands input to the WSS 2 and that determines an optical signal wavelength band and a noise wavelength band, based on the measured strengths. The WSS 2 passes the optical signal in the optical signal wavelength band determined by the OCM 1 as a primary signal. The dummy light generation unit 3 generates dummy light in which the optical signal wavelength band has been extinguished. The optical coupler 4 is a multiplexer that multiplexes the primary signal output from the WSS 2 with the dummy light and outputs the result as wavelength division multiplexing optical signals to an optical transmission path. By using this configuration, it is possible to suppress the deterioration of optical signal characteristics, even when the noise level of the optical signal to be delivered to the opposite station is high.

Figure 3:
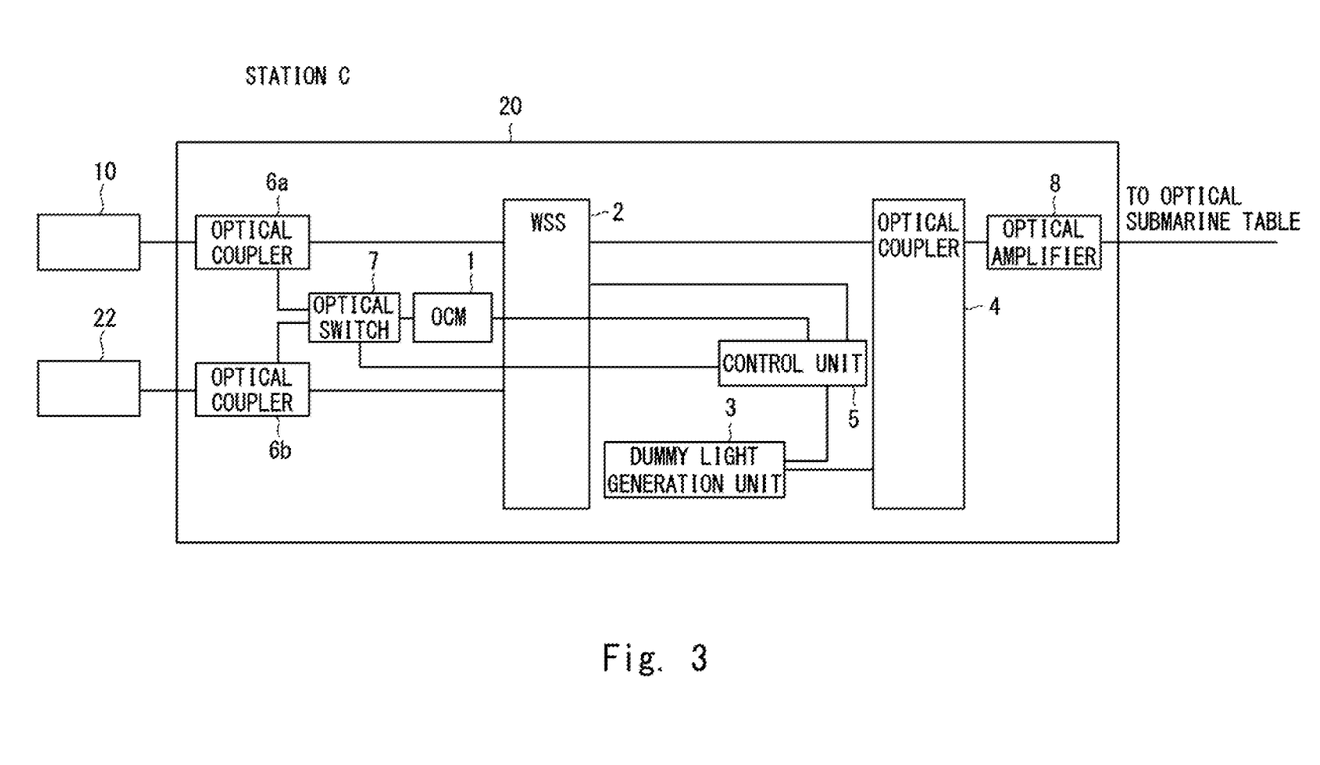
FIG. 3 is a diagram showing an example of the optical multiplexer/demultiplexer according to the example embodiment.

Next, a specific example of the optical multiplexer/demultiplexer 20 according to the example embodiment will be explained with reference to FIG. 3. FIG. 3 is a diagram showing an example of the optical multiplexer/demultiplexer according to the example embodiment. As shown in FIG. 3, the optical multiplexer/demultiplexer 20 includes the OCM 1, the WSS 2, the dummy light generation unit 3, the optical coupler 4, the control unit 5, optical couplers 6a and 6b, an optical switch 7, and the optical amplifier 8. The WSS 2 includes a plurality of input ports to each of which a different one of a plurality of optical signals is input. In the present example, there are two input ports that receive, respectively, the inputs of the optical signal from the optical transmitter/receiver 10 and the optical signal from the optical multiplexer/demultiplexer 22.

The input ports have connected thereto, respectively, the optical coupler 6a and the optical coupler 6b each serving as an optical brancher that branches a corresponding one of the plurality of optical signals to the OCM 1. In the example shown in FIG. 3, the optical signal from the optical transmitter/receiver 10 is branched by the optical coupler 6a so that a result is input to the optical switch 7. In contrast, the optical signal from the optical multiplexer/demultiplexer 22 is branched by the optical coupler 6b, so that a result is input to the optical switch 7. While being controlled by the control unit 5, the optical switch 7 selects one of the plurality of optical signals branched by the optical couplers 6a and 6b and inputs the selected optical signal to the OCM 1. This configuration makes it possible to select the optical signal to be monitored by the OCM 1.

At sampling points provided at predetermined frequency intervals, the OCM 1 measures the strengths of the optical signal from the optical transmitter/receiver 10 and of the optical signal from the optical multiplexer/demultiplexer 22 that are input to the WSS 2. Further, based on the measured strengths of the optical signals, the OCM 1 determines an optical signal wavelength band, which is the wavelength band of the optical signal to be delivered to the opposite station, and a noise wavelength band and further transmits a determination result to the control unit 5.

The control unit 5 is structured by using any of various types of signal processing circuits, such as a central processing unit (CPU), for example. Based on the determination result from the OCM 1, the control unit 5 controls the optical signal to be passed by the WSS 2. More specifically, the control unit 5 creates, within the WSS 2, a filter corresponding to the optical signal wavelength band. The WSS 2 outputs an optical signal in the wavelength band corresponding to the created filter, to the optical coupler 4, as a primary signal.

The dummy light generation unit 3 generates dummy light used for stabilizing gain characteristics of the optical amplification repeater (not shown) provided in the optical submarine cable system 100. The optical transmitter/receiver 12 generates amplified spontaneous emission (ASE) dummy light based on spontaneous emission optical noise from an erbium doped optical fiber amplifier (EDFA) and generates the dummy light by shaping the ASE dummy light with the use of the wavelength filter.

The control unit 5 controls the dummy light generation unit 3 so as to turn off the output of the dummy light corresponding to the optical signal wavelength band. As a result, in the dummy light output from the dummy light generation unit 3 to the optical coupler 4, the optical signal wavelength band is extinguished.

The optical coupler 4 multiplexes the primary signal with the dummy light in which the dummy light corresponding to the optical signal wavelength band has been extinguished and further outputs the optical signals resulting from the multiplexing, to the optical amplifier 8. The optical amplifier 8 amplifies the optical signals output from the optical coupler 4 and further outputs the amplified result as wavelength division multiplexing optical signals to the optical submarine cable.

Figure 4:
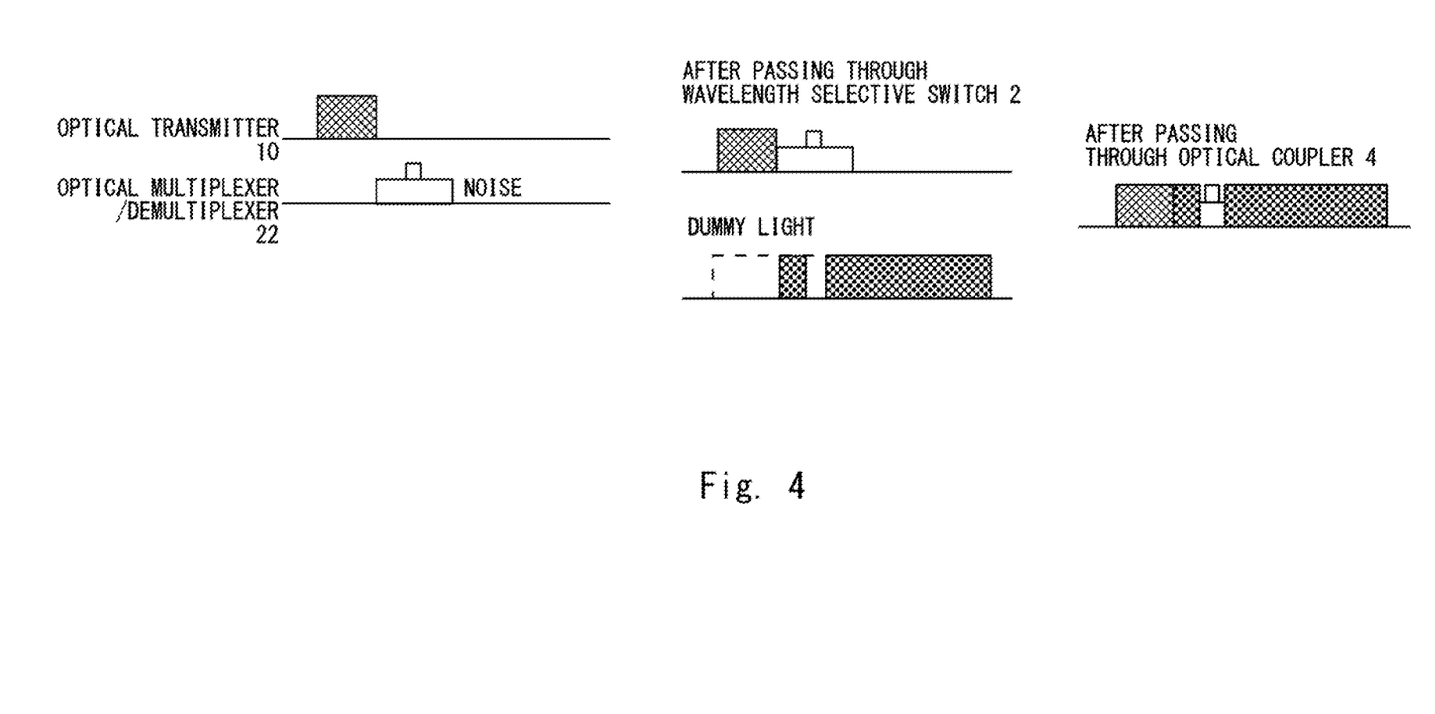
FIG. 4 is a drawing for explaining wavelength division multiplexing optical signals obtained in the example embodiment.

Next, an operation of the optical multiplexer/demultiplexer 20 will be explained. FIG. 4 is a drawing for explaining the wavelength division multiplexing optical signals obtained through functional units of the optical multiplexer/demultiplexer 20 in the example embodiment. The left section of FIG. 4 shows the optical signal from the optical transmitter/receiver 10 and the optical signal from the optical multiplexer/demultiplexer 22. These optical signals are input through the two input ports of the WSS 2, respectively.

At first, the optical switch 7 selects an optical signal of which the strength is to be measured by the OCM 1. When the optical switch 7 is connected to the optical coupler 6a, the OCM 1 is capable of monitoring the optical signal from the optical transmitter/receiver 10. In contrast, when the optical switch 7 is connected to the optical coupler 6b, the OCM 1 is capable of monitoring the optical signal from the optical multiplexer/demultiplexer 22. Further, the OCM 1 measures the strength at each of the sampling points so as to determine the optical signal wavelength band and the noise wavelength band.

Figure 5:
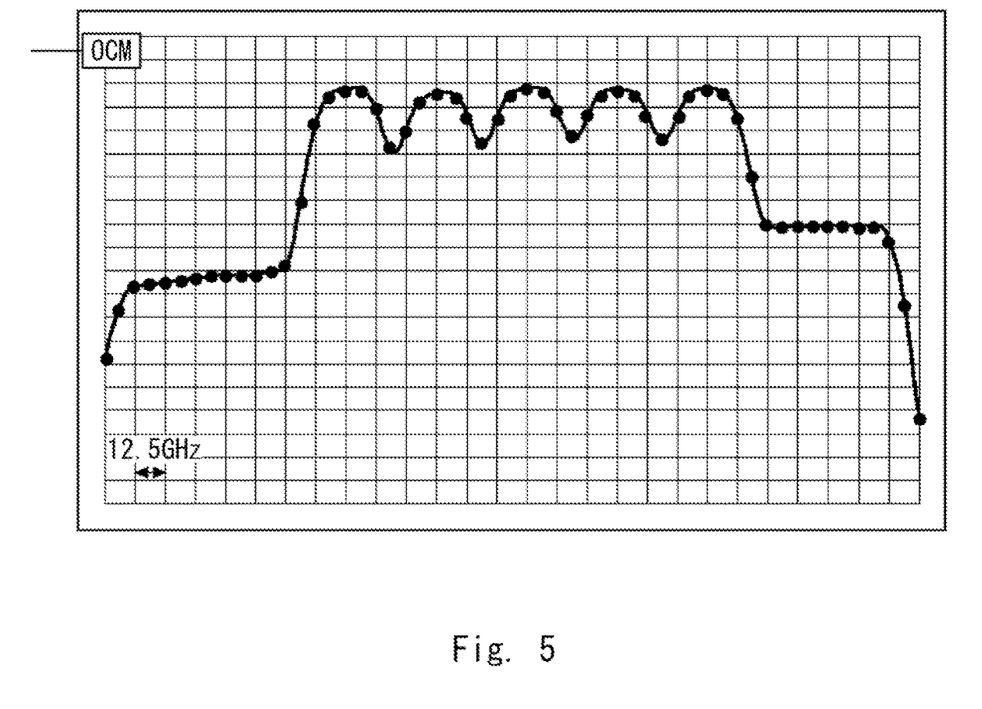
FIG. 5 is a chart showing an example of measurement results obtained by the OCM shown in FIG. 3.
Figure 6:
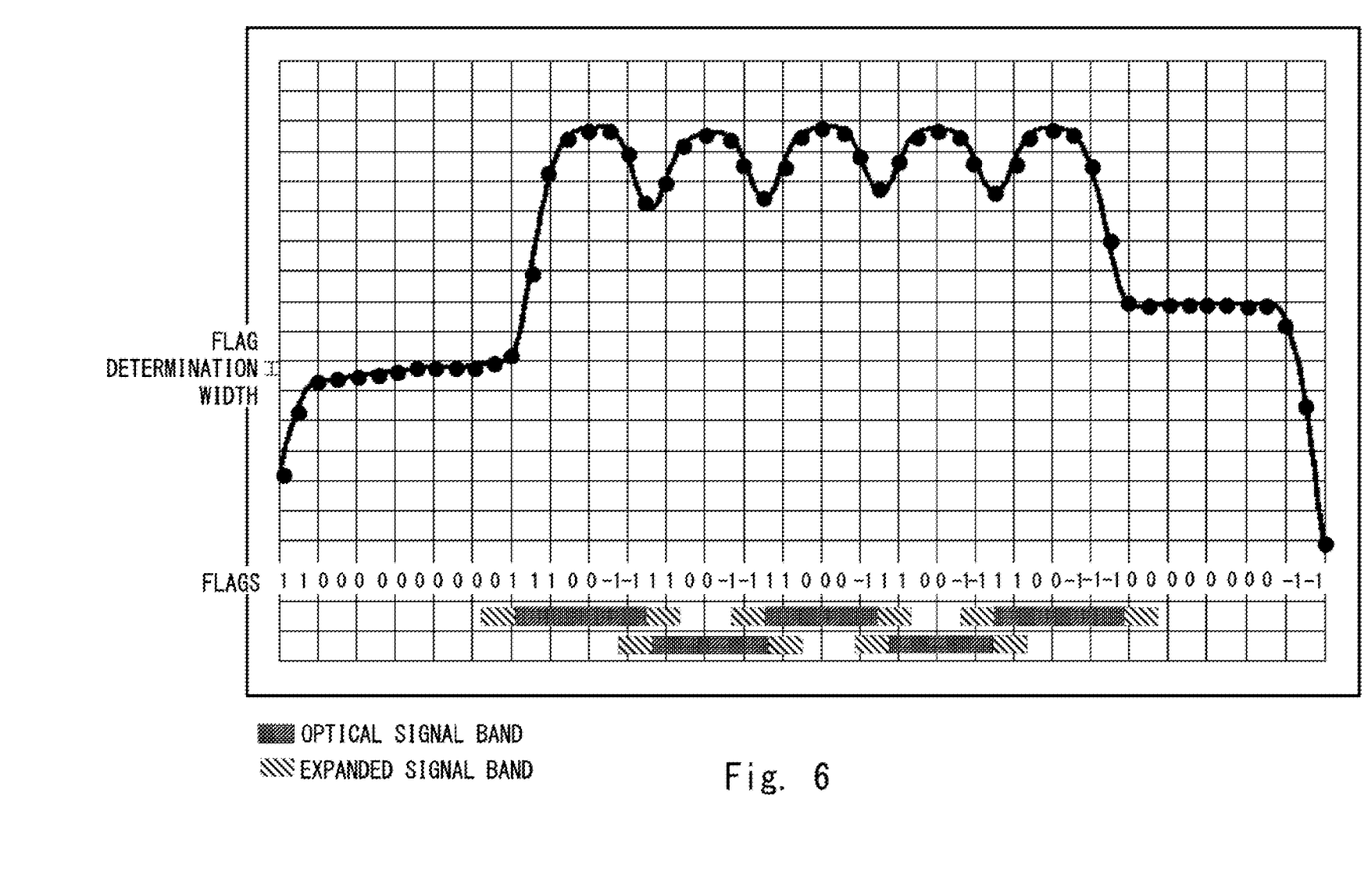
FIG. 6 is a chart for explaining a process of determining optical signal wavelength bands based on the measurement results shown in FIG. 5.

Next, a process of determining optical signal wavelength bands performed by the OCM 1 will be explained, with reference to FIGS. 5 and 6. FIG. 5 is a chart showing an example of measurement results obtained by the OCM 1 shown in FIG. 3. FIG. 6 is a chart for explaining the process of determining the optical signal wavelength bands based on the measurement results shown in FIG. 5. In the example shown in FIG. 5, a minimum resolution of the OCM 1 is 6.25 GHz, so that the optical strength is monitored for every 6.25 GHz (which means that eight measurement results are obtained for 50 GHz).

Further, the difference between the strengths at two consecutive sampling points is calculated. A flag 1 is assigned when the difference between the strengths of the optical signals at any two consecutive sampling points is positive, while the value thereof is equal to or larger than a predetermined value. As another example, a flag −1 is assigned when the difference between the strengths of the optical signals at any two consecutive sampling points is negative, while the absolute value thereof is equal to or larger than the predetermined value. A flag 0 is assigned when the absolute value of the difference between the strengths of the optical signals at any two consecutive sampling points is smaller than the predetermined value. Accordingly, as shown in the bottom section of FIG. 6, a flag is determined with respect to each of the sampling points.

When the flag assignment has been completed for each of all the sampling points, it is possible to determine the ranges positioned between the flag 1 and the flag −1 as the optical signal wavelength bands in which an optical signal is present. In FIG. 6, the optical signal wavelength bands are indicated by using shaded areas with dots. Further, it is possible to determine the wavelength bands other than the optical signal wavelength bands as noise wavelength bands. Further, to cover the tails of the optical signals, the OCM 1 may determine expanded wavelength bands that are each obtained by expanding a wavelength band positioned between the flag 1 and the flag −1 by a predetermined wavelength band, as optical signal wavelength bands.

Further, the OCM 1 notifies the control unit 5 of the determination result. Based on the determination result from the OCM 1, the control unit 5 controls the WSS 2 so as to pass the optical signals in the optical signal wavelength bands. The upper middle section of FIG. 4 shows the optical signals (the primary signal) after passing through the WSS 2. Also, the control unit 5 controls the dummy light generation unit 3 so as to turn off the output of the dummy light corresponding to the optical signal wavelength band. The lower middle section of FIG. 4 shows the dummy light in which the optical signal wavelength band has been extinguished. By multiplexing the primary signal with the dummy light, the optical signals as shown in the right section of FIG. 4 are obtained.

As explained above, according to the example embodiment, it is possible to accurately determine the optical signal wavelength bands in which the optical signals are present and the noise wavelength bands. This configuration makes it possible to control the dummy light in accordance with the presence and absence of the optical signals and to thus suppress the deterioration of the transmission characteristics.

Further, in the example embodiment, the optical signals and the noise are determined by actually monitoring the spectra of the optical signals. Accordingly, an advantageous effect is achieved where it is possible to accurately determine the presence and absence of the optical signals and to control the dummy light, without the user having to understand the wavelength bands of the optical signals in advance. Consequently, it is possible to enhance convenience of the user, without the need to understand, for example, the wavelength of an optical signal input from an optical multiplexer/demultiplexer provided in a remote location.

The present invention is not limited to the example embodiments described above. It is possible to apply modifications thereto as appropriate without departing from the gist thereof. For example, the control unit 5 may perform the flag assignment process and the optical signal band determination process performed by the OCM 1 in the above example. In other words, the control unit 5 may calculate the differences between the strengths of the optical signals to assign the flags, while the OCM 1 is configured to only output the results of measuring the strengths of the optical signals.

Figure 7:
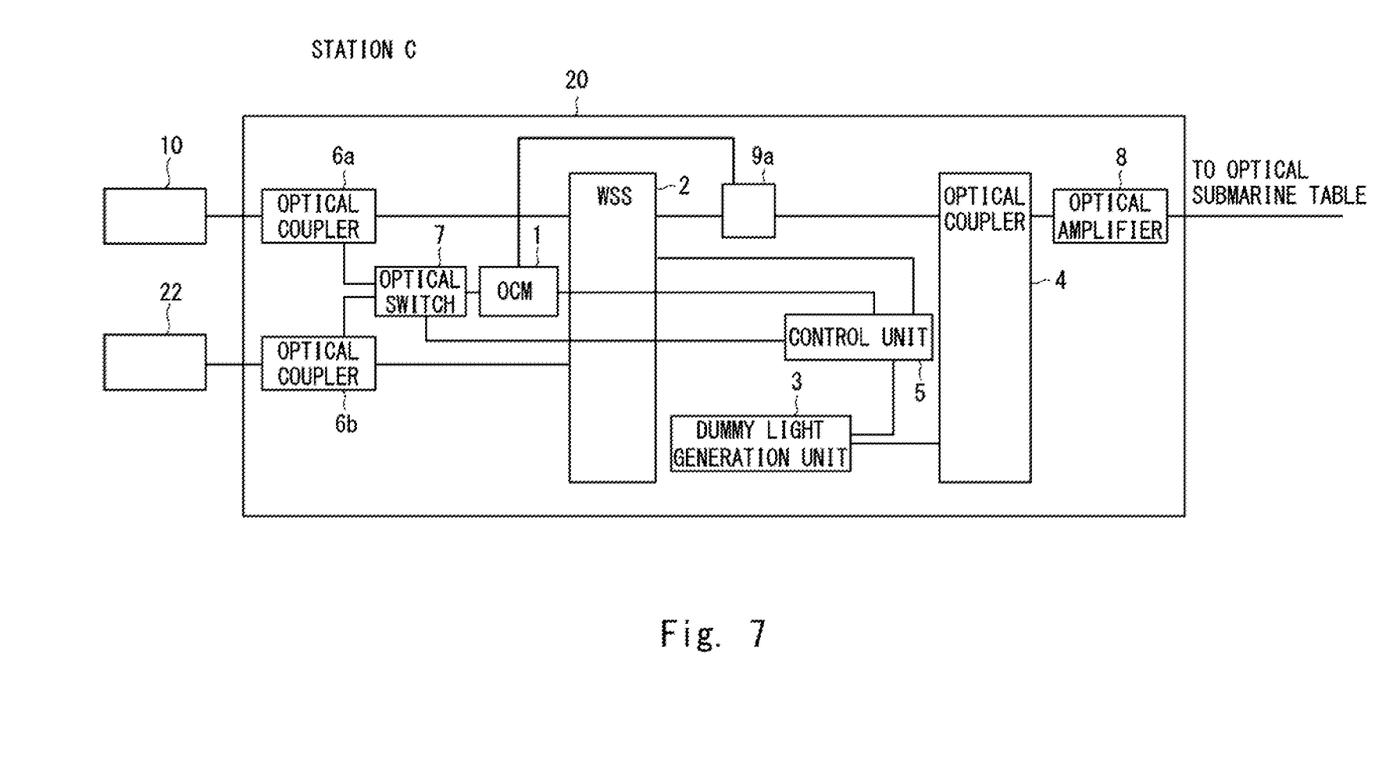
FIG. 7 is a diagram showing another example of the optical multiplexer/demultiplexer according to the example embodiment.
Figure 8:
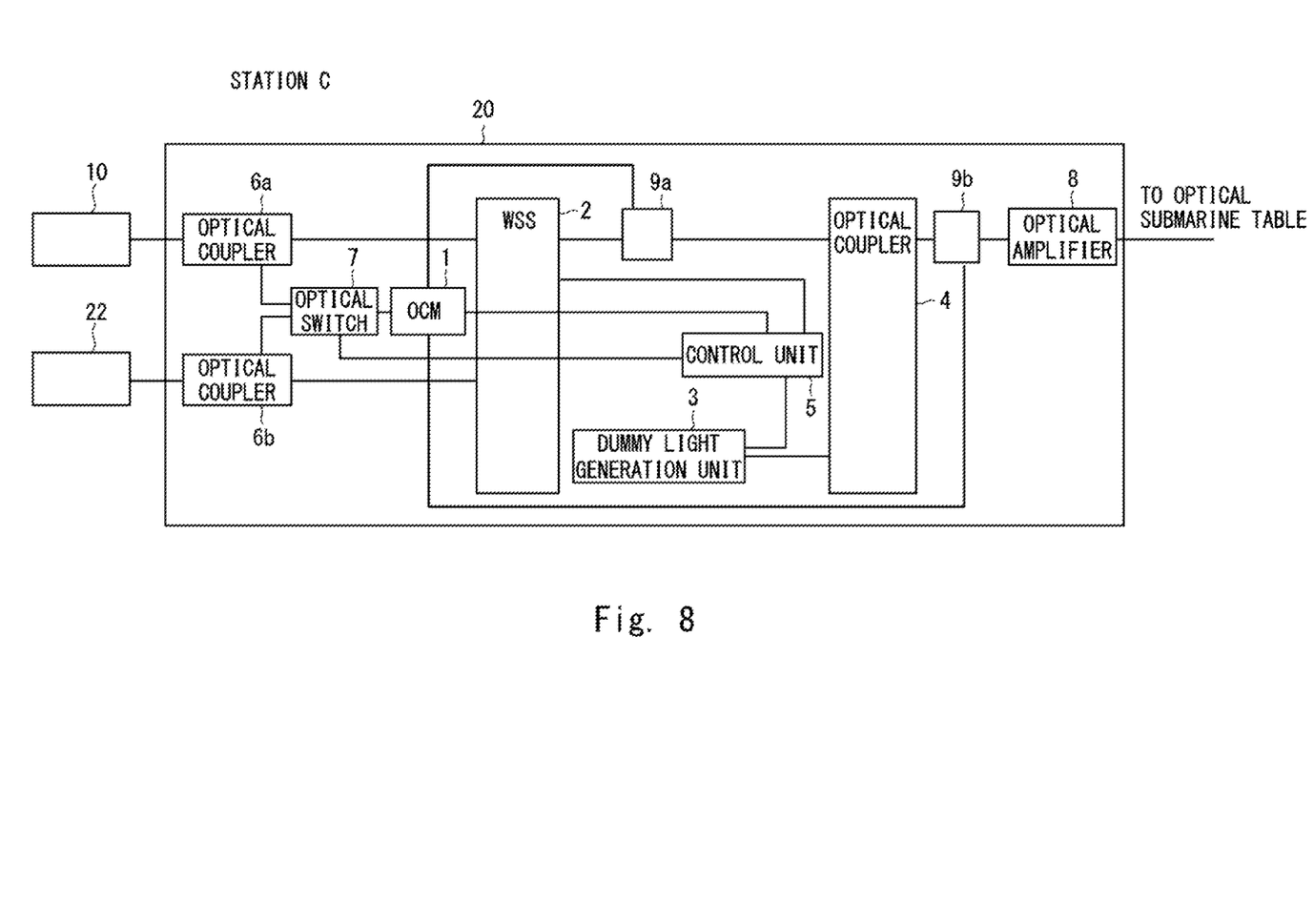
FIG. 8 is a diagram showing yet another example of the optical multiplexer/demultiplexer according to the example embodiment.

Further, as shown in FIG. 7, it is also acceptable to provide an optical brancher 9a between the WSS 2 and the optical coupler 4, so that an output of the WSS 2 is input to the OCM 1. Furthermore, as shown in FIG. 8, it is also acceptable to provide an optical brancher 9b between the optical coupler 4 and the optical amplifier 8, so that an output of the optical coupler 4 is input to the OCM 1.

The invention of the present disclosure has thus been explained with reference to the example embodiments; however, the invention of the present disclosure is not limited to the above description. The configurations and the details of the invention of the present disclosure may be modified in various manners that are comprehensible for a person skilled in the art within the scope of the invention.

This application is based upon and claims the benefit of priority from Japanese Patent Application No. 2019-038360 filed on Mar. 4, 2019, the entire contents of which are incorporated herein by reference.

REFERENCE SIGNS LIST

1 OCM
2 WSS
3 Dummy light generation unit
4 Optical coupler
5 Control unit
6 Optical coupler
6a Optical coupler
6b Optical coupler
7 Optical switch
8 Optical amplifier
9a Optical brancher
9b Optical brancher
10 Optical transmitter/receiver
11 Optical transmitter/receiver
12 Optical transmitter/receiver
13 Optical transmitter/receiver
20 Optical multiplexer/demultiplexer
21 Optical multiplexer/demultiplexer
22 Optical multiplexer/demultiplexer
23 Optical multiplexer/demultiplexer
30 Submarine optical branching device
100 Optical submarine cable system

What is claimed is:

1. An optical multiplexer/demultiplexer comprising:
an optical strength monitor configured to measure a strength of each of optical signals in a plurality of wavelength bands input to a wavelength selective switch and to determine an optical signal wavelength band and a noise wavelength band based on the measured strengths;
the wavelength selective switch configured to pass the optical signal in the optical signal wavelength band determined by the optical strength monitor as a primary signal;
dummy light generation unit configured to generate dummy light in which the optical signal wavelength band has been extinguished; and
a multiplexer configured to multiplex the primary signal output from the wavelength selective switch with the dummy light into a wavelength division multiplexing optical signal and to output the wavelength division multiplexing optical signal to an optical transmission path.

2. The optical multiplexer/demultiplexer according to claim 1, wherein
the wavelength selective switch includes a plurality of input ports to each of which a different one of the plurality of optical signals is input, and
each of the plurality of input ports is connected to an optical brancher configured to branch a corresponding one of the plurality of optical signals to the optical strength monitor.

3. The optical multiplexer/demultiplexer according to claim 2, further comprising a switch configured to select one of a plurality of optical signals branched by the optical brancher and to input the selected optical signal to the optical strength monitor.

4. The optical multiplexer/demultiplexer according to claim 1, wherein
the optical strength monitor is an optical channel monitor configured to measure the strengths of the optical signals at sampling points provided at predetermined frequency intervals,
a flag 1 is assigned when a difference between strengths of optical signals at any two consecutive sampling points among the sampling points is positive, while a value thereof is equal to or larger than a predetermined value,
a flag −1 is assigned when the difference between the strengths of the optical signals at any two consecutive sampling points among the sampling points is negative, while an absolute value thereof is equal to or larger than the predetermined value,
a flag 0 is assigned when an absolute value of the difference between the strengths of the optical signals at any two consecutive sampling points among the sampling points is smaller than the predetermined value, and
a wavelength band between the flag 1 and the flag −1 is determined as the optical signal wavelength band.

5. The optical multiplexer/demultiplexer according to claim 4, wherein the optical strength monitor determines an expanded wavelength band obtained by expanding the wavelength band positioned between the flag 1 and the flag −1 by a predetermined wavelength band, as the optical signal wavelength band.

6. An optical submarine cable system comprising:
a first trunk station and a second trunk station provided on land;
an optical submarine cable configured to connect the first trunk station and the second trunk station to each other;
a submarine branching device inserted at a certain point of the optical submarine cable;
a branch station connected to the submarine branching device and installed on the land; and
the optical multiplexer/demultiplexer according to claim 1 that is installed at the branch station.

7. The optical submarine cable system according to claim 6, wherein the branch station is configured to structure a reconfigurable optical add/drop multiplexer (ROADM) by using the optical multiplexer/demultiplexer.

8. A non-transitory computer readable medium configured to cause a computer to execute:
a process of measuring a strength of each of optical signals in a plurality of wavelength bands input to a wavelength selective switch and determining an optical signal wavelength band and a noise wavelength band based on the measured strengths;
a process of causing the wavelength selective switch to pass the optical signal in the determined optical signal wavelength band as a primary signal;
a process of generating dummy light in which the optical signal wavelength band has been extinguished; and
a process of multiplexing the primary signal with the dummy light into a wavelength division multiplexing optical signal and outputting the wavelength division multiplexing optical signal to an optical transmission path.

* * * * *